United States Patent
Wiley et al.

(10) Patent No.: US 12,450,734 B2
(45) Date of Patent: Oct. 21, 2025

(54) SYSTEM AND METHOD OF LANDMARK-BASED SEGMENTATION AND TRANSFORMATION OF PHYSICAL STRUCTURES

(71) Applicant: STRATOVAN CORPORATION, Davis, CA (US)

(72) Inventors: David Wiley, Davis, CA (US); David Hatcher, Kennewick, WA (US)

(73) Assignees: Stratovan Corporation, Davis, CA (US); BeamReaders, Kennewick, WA (US)

( * ) Notice: Subject to any disclaimer, the term of this patent is extended or adjusted under 35 U.S.C. 154(b) by 456 days.

(21) Appl. No.: 17/863,321

(22) Filed: Jul. 12, 2022

(65) Prior Publication Data
US 2024/0020826 A1   Jan. 18, 2024

(51) Int. Cl.
*G06T 7/00* (2017.01)
*G06T 7/11* (2017.01)
*G06T 17/10* (2006.01)

(52) U.S. Cl.
CPC ........... *G06T 7/0012* (2013.01); *G06T 7/11* (2017.01); *G06T 17/10* (2013.01); *G06T 2207/30036* (2013.01)

(58) Field of Classification Search
CPC ......... G06T 7/0012; G06T 7/11; G06T 17/10; G06T 2207/30036; G06T 7/0014; G06T 7/68; G06T 2219/004; G06T 19/00; G06T 17/00; G06T 2210/41; A61C 7/002; A61C 9/0053; G16H 30/40; G16H 50/50
USPC ........................................................ 382/128
See application file for complete search history.

(56) References Cited

U.S. PATENT DOCUMENTS

| 8,644,578 B1 * | 2/2014 | Wiley ............... G06T 17/00 382/131 |
| 2009/0268956 A1 * | 10/2009 | Wiley ............... G06T 7/13 382/131 |
| 2023/0186476 A1 * | 6/2023 | Ghazvinian Zanjani ............ G06T 7/62 706/20 |

* cited by examiner

*Primary Examiner* — Jacky X Zheng
(74) *Attorney, Agent, or Firm* — Foley & Lardner LLP

(57) ABSTRACT

Example implementations include a method of mapping and segmenting a physical object by obtaining a plurality of two-dimensional images of a physical object, generating a three-dimensional object model of the physical object based at least partially on one or more of the two-dimensional images, obtaining a plurality of landmarks associated with the object model, one or more of the landmarks being respectively associated with corresponding three-dimensional coordinates and object plane identifiers, and generating at least one landmark plane at the object model including one or more of the landmarks including the object plane identifiers.

15 Claims, 14 Drawing Sheets

SYSTEM AND METHOD OF LANDMARK-BASED SEGMENTATION AND TRANSFORMATION OF PHYSICAL STRUCTURES

TECHNICAL FIELD

The present implementations relate generally to biomedical imaging, and more particularly to landmark-based segmentation and transformation of physical structures.

BACKGROUND

Biomedical imaging requires increasing complex biomedical data input and computational processing to achieve successful medical outcomes. Conventional systems may not effectively process biomedical imaging information with sufficient speed and at sufficient granularity to support individualized patient care.

SUMMARY

It is advantageous to process biomedical data associated with a patient and generate a transformation model indicating potential medically-sound physical transformations, and challenges to executing those physical transformations. It is further advantageous to simplify image processing to reduce computation to focus on particular relevant physical features and transformations, and to execute image processing at a level of granularity sufficient to drive individual patient outcomes. Thus, a technological solution for landmark-based segmentation and transformation of physical structures is desired.

Example implementations include a method of mapping and segmenting a physical object by obtaining a plurality of two-dimensional images of a physical object, generating a three-dimensional object model of the physical object based at least partially on one or more of the two-dimensional images, obtaining a plurality of landmarks associated with the object model, one or more of the landmarks being respectively associated with corresponding three-dimensional coordinates and object plane identifiers, and generating a landmark plane at the object model including one or more of the landmarks including the object plane identifiers.

Example implementations also include a method of identifying an anomaly in a physical object by obtaining a three-dimensional target model of a target physical object including at least one target class identifier and at least one target landmark associated with the target model, the target landmark being associated with corresponding three-dimensional target coordinates, obtaining a three-dimensional reference model associated with a reference physical object, the reference model including at least one reference class identifier corresponding to the target class identifier and at least one reference landmark associated with the reference model, the reference landmark being associated with corresponding three-dimensional reference coordinates and corresponding to the target landmark, and generating a class deviation metric based on the target landmark and the reference landmark.

Example implementations also include a system with an image processing engine operable by a processor to obtain a plurality of two-dimensional images of a physical object, and generate a three-dimensional object model of the physical object based at least partially on one or more of the two-dimensional images, and a landmark processing engine operable by the processor to obtain a plurality of landmarks associated with the object model, one or more of the landmarks being respectively associated with corresponding three-dimensional coordinates and object plane identifiers, and to generate a landmark plane at the object model including one or more of the landmarks including the object plane identifiers.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

Figure 1A:
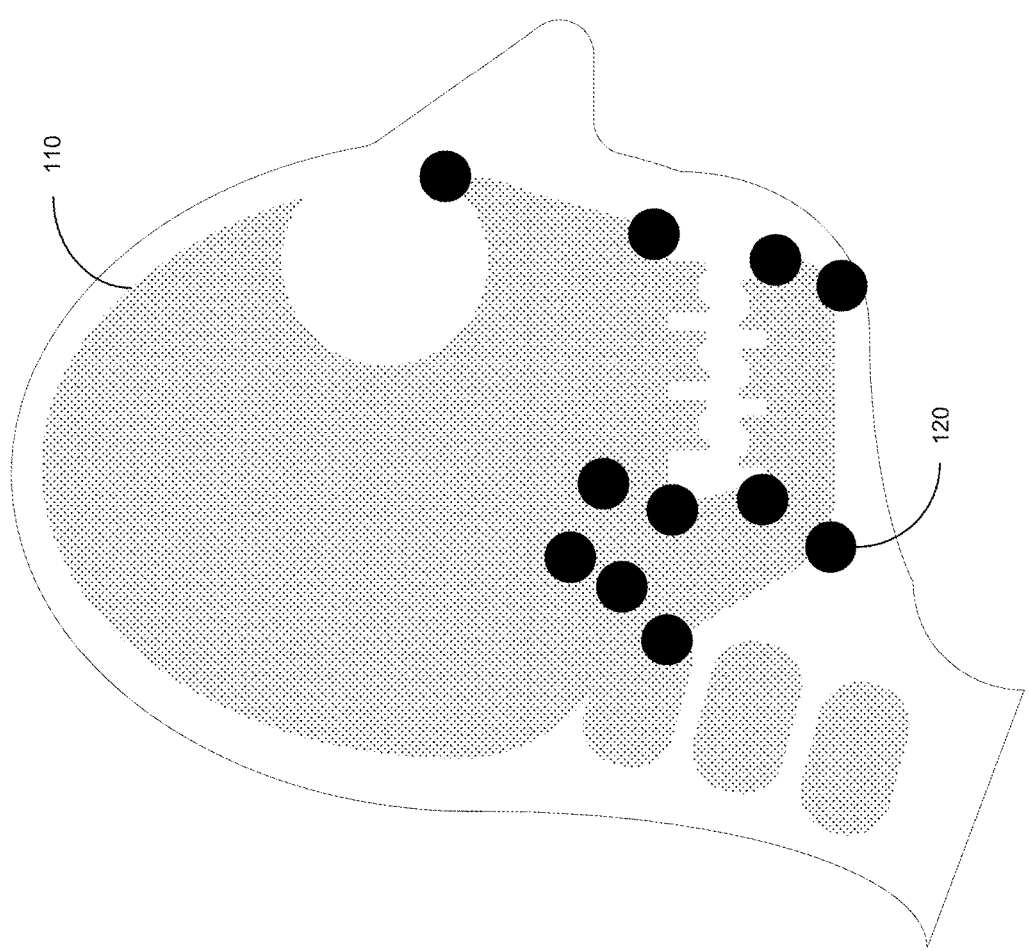
FIG. 1A illustrates an example first state of an example object model, in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Example implementations include a metric-based processing system including computational hardware and software operable to execute metric-based processes directed to landmark-based segmentation and transformation of physical structures. Specifically, example implementations are directed to applying metric-based analysis to identify and isolate physical features associated with particular physical structures within a three-dimensional (3D) model or images from which it is derived. Landmarks identifying these physical features can be co-located with those features, and various image processing processes associated with various physical structures can be performed on regions of the 3D model to identify the physical structures likely to exist within those regions. As one example, a first image processor can operate on a first portion of a 3D model in which teeth are likely to be present, and a second image processor can operation on a second portion of the 3D model in which a mandible is likely to be present. Thus, in some implementations, a high degree of granularity in a 3D model for a patient can be achieved by limiting various metric-based processors to various segments of portions of a 3D model. Further, example implementations can transform a 3D model in accordance with an orthodontic model or the like to generate a transformed 3D model for a patient corresponding to an orthodontic or like state. As one example, a 3D model can be transformed to remove an overbite, and potential interferences between a mandible and various teeth can be generated and quantified.

It is to be understood that the metric-based processing can include machine learning processing based on metrics associated with landmark features, dentition features, and the like. It is to be further understood that the metric-based processing can be executed by particular processors including transform processors and parallel processors operable in accordance with particular portions of or categories of machine learning processes governed by particular metrics at least disclosed herein. Thus, in some implementations, the metric-based processing includes a machine learning platform configured or constructed to execute particular processes based on the metrics and system disclosed herein.

FIG. 1A illustrates an example first state of an example object model, in accordance with present implementations. As illustrated by way of example in FIG. 1A, an example object model 100A includes an object model 110 and landmarks 120.

The object model source 110 is or includes one or more 2D images associated with a patient and combined into a 3D model for that patient. In some implementations, the object model source 110 includes multiple Digital Imaging and Communications in Medicine (DICOM) images. In some implementations, the object model source 110 is presented as a 2D projection on a predetermined plane through the 3D model associated with the patient. As one example, a predetermined plane can be a transverse plane, a coronal plane, or a sagittal plane dividing or bisecting the 3D model. In some implementations, the landmarks 120 can be projected onto the predetermined plane to present the landmarks relative to a particular 2D image of the object model source 110. As illustrated by way of example in FIGS. 1A-3B, the landmarks 120 can be presented relative to a midsagittal plane.

The landmarks 120 include one or more coordinates relative to the 3D model and located at or proximate to a particular feature of the 3D model. In some implementations, the landmarks 120 are placed at a particular coordinate based on a determination that features of the 3D model or 2D images associated with the 3D model correspond to a particular structural feature of the 3D model. In some implementations, a structural feature includes a shape, or the like detected in a 2D image or a 3D model. In some implementations, the landmarks 120 include landmark identifiers indicating a particular feature of a 3D model associated with a patient. As one example, a landmark identifier can include a label or the like indicating that a corresponding landmark is located at or proximate to a particular feature or structure of the 3D model, such as a bone joint, curvature, protrusion, boundary, or the like.

Figure 1B:
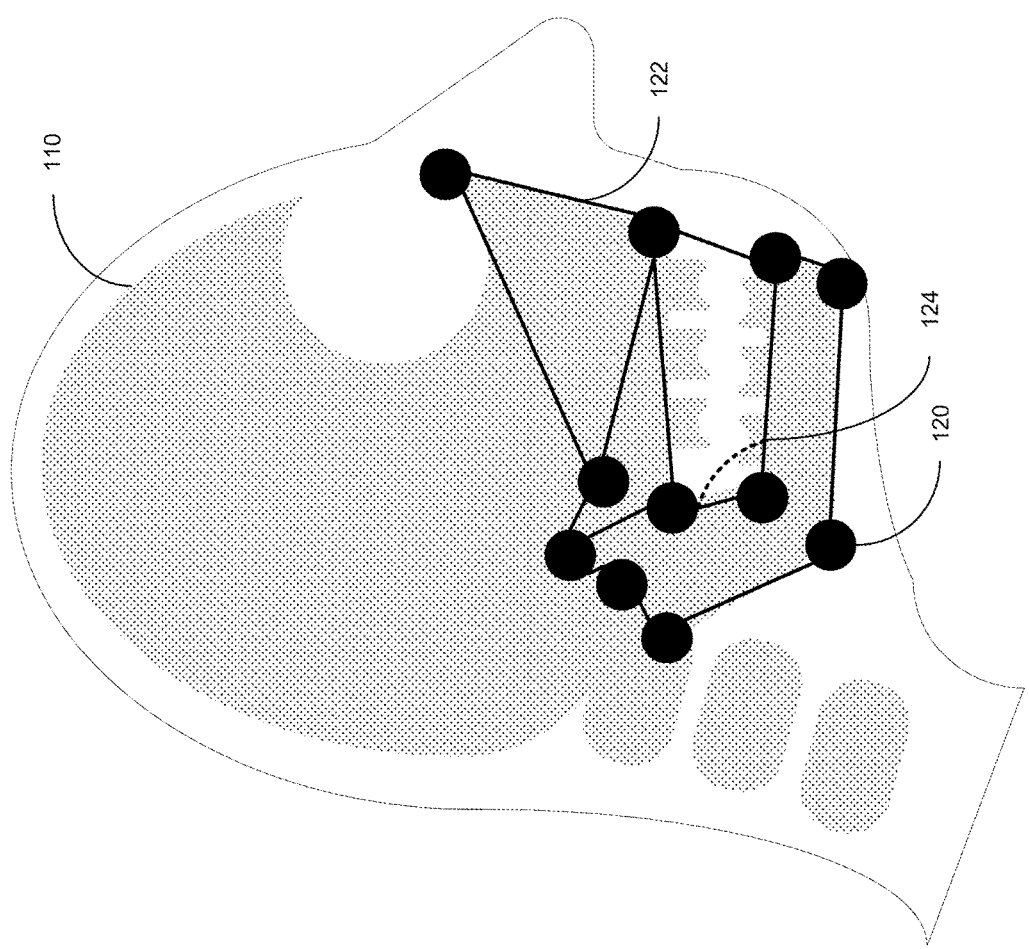
FIG. 1B illustrates an example second state of an example object model, in accordance with present implementations.

FIG. 1B illustrates an example second state of an example object model, in accordance with present implementations. As illustrated by way of example in FIG. 1B, an example object model 100B includes the object model source 110, the landmarks 120, landmark distance objects 122, and landmark angle objects 124. In some implementations, the second state is or includes a node graph object in which the landmarks 120 are nodes and the landmark distance objects 122 are edges connecting various pairs of the landmarks 120.

The landmark distance objects 122 include distance relationships between particular pairs of landmarks 120. In some implementations, the landmark distance objects 122 are generated only between particular pairs of landmarks 120 having predetermined landmark identifiers. As one example, a landmark distance object can be generated between a first landmark at a front and base of a mandible, and a second landmark at a rear and base of the mandible to indicate a lower boundary of the mandible. It is to be understood that that the landmark distance objects 122 can be generated between any pair of landmarks 120 having anatomical, surgical, clinical, analytical, or like meaning.

The landmark angle objects 124 include angular relationships between particular pairs of landmark distance objects 122 or groups of landmarks 120. In some implementations, the landmark angle objects 124 are generated only between particular pairs of landmark distance objects 122 having predetermined landmark identifiers. As one example, a landmark angle object can be generated between a first landmark distance object along a top edge of a mandible, and a second landmark distance object along a rear edge of the mandible to indicate a an angle at the base of the mandible. It is to be understood that that the landmark angle objects 124 can be generated between any pair of landmark distance objects 122 or groups of landmarks 120 having anatomical, surgical, clinical, analytical, or like meaning.

Figure 1C:
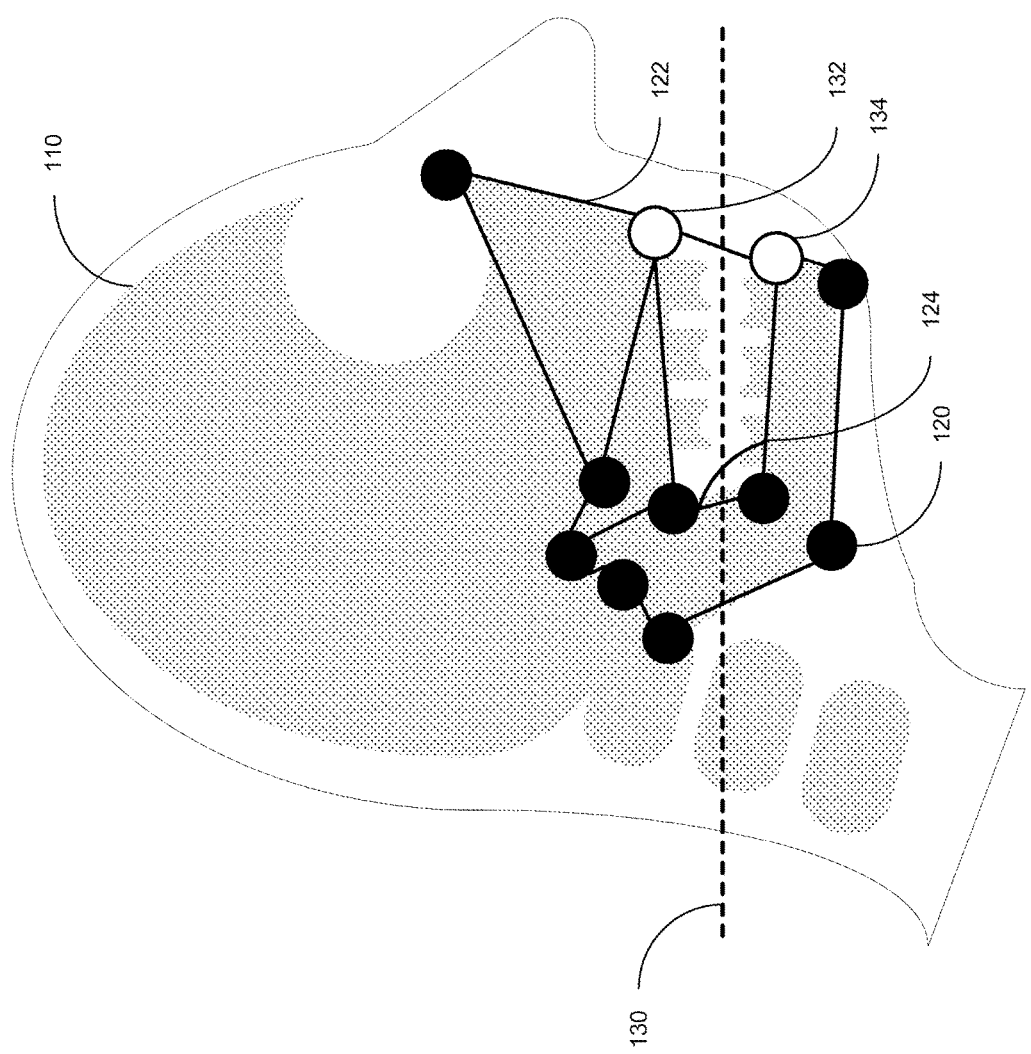
FIG. 1C illustrates an example third state of an example object model, in accordance with present implementations.

FIG. 1C illustrates an example third state of an example object model, in accordance with present implementations. As illustrated by way of example in FIG. 1C, an example object model 100C includes the object model source 110, the landmarks 120, the landmark distance objects 122, the landmark angle objects 124, and a symmetry plane 130. In some implementations, the landmarks 120 include a first landmark 132 associated with the symmetry plane 130, and a corresponding landmark 134 associated with the symmetry plane 130 and the first landmark 132.

The symmetry plane 130 is disposed relative to one or more landmarks 120 to indicate a plane having anatomical, surgical, clinical, analytical, or like meaning. In some implementations, the symmetry plane 130 is disposed through a particular region of a 3D model associated with a patient to create a viewable cross section through the 3D model of the patient corresponding to a particular anatomical or medically-informative plane. As one example, the symmetry plane 130 can be disposed through a 3D model above the mandible and substantially parallel to dental cap surface thereof. In this example, landmarks, dentition structures, maxillofacial structures, and the like can be projected onto the symmetry plane 130 to generate at least one 2D image for either or both of the upper teeth and lower teeth.

The first landmark 132 and the corresponding landmark 134 are example reference landmarks facilitating the placement and orientation of the symmetry plane 130. In some implementations, the symmetry plane 130 is placed and oriented relative to one or more landmarks 120 associated with particular landmark identifiers. Thus, in some implementations, the symmetry plane 130 can be placed and oriented within a 3D model through a simplified and faster process based on input from one or more landmarks 120 and reducing or eliminating requirements to conduct image processing across a significant portion of a 3D model or collection of 2D images.

Figure 2A:
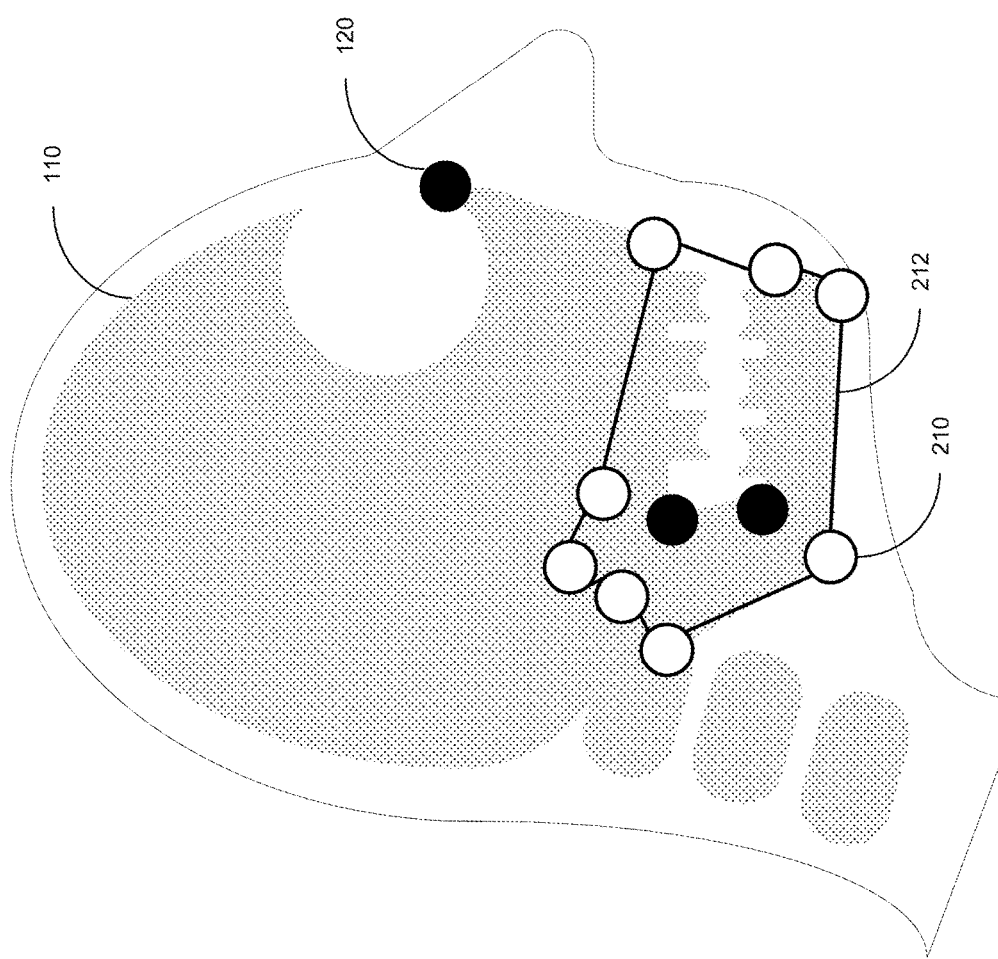
FIG. 2A illustrates an example fourth state of an example object model, in accordance with present implementations.

FIG. 2A illustrates an example fourth state of an example object model, in accordance with present implementations. As illustrated by way of example in FIG. 2A, an example object model 200A includes the object model source 110, the landmarks 120, and segmentation objects 212. In some implementations, the landmarks 120 include segmentation landmarks 210.

The segmentation landmarks 210 are associated with a particular region of the 3D model or collection of 2D images having anatomical, surgical, clinical, analytical, or like meaning. In some implementations, the segmentation landmarks 210 are associated with a particular subset of landmark identifiers, and the particular subset of landmark identifiers is associated with a particular biological structure. As one example, the segmentation landmarks 210 and the segmentations objects 212 can together define boundaries of a dentition region and include landmarks associated with landmark identifiers defining boundaries, features, or the like, of the dentition region. The segmentation objects 212 are or include various landmark distance objects 122 between the segmentation landmarks 210.

Figure 2B:
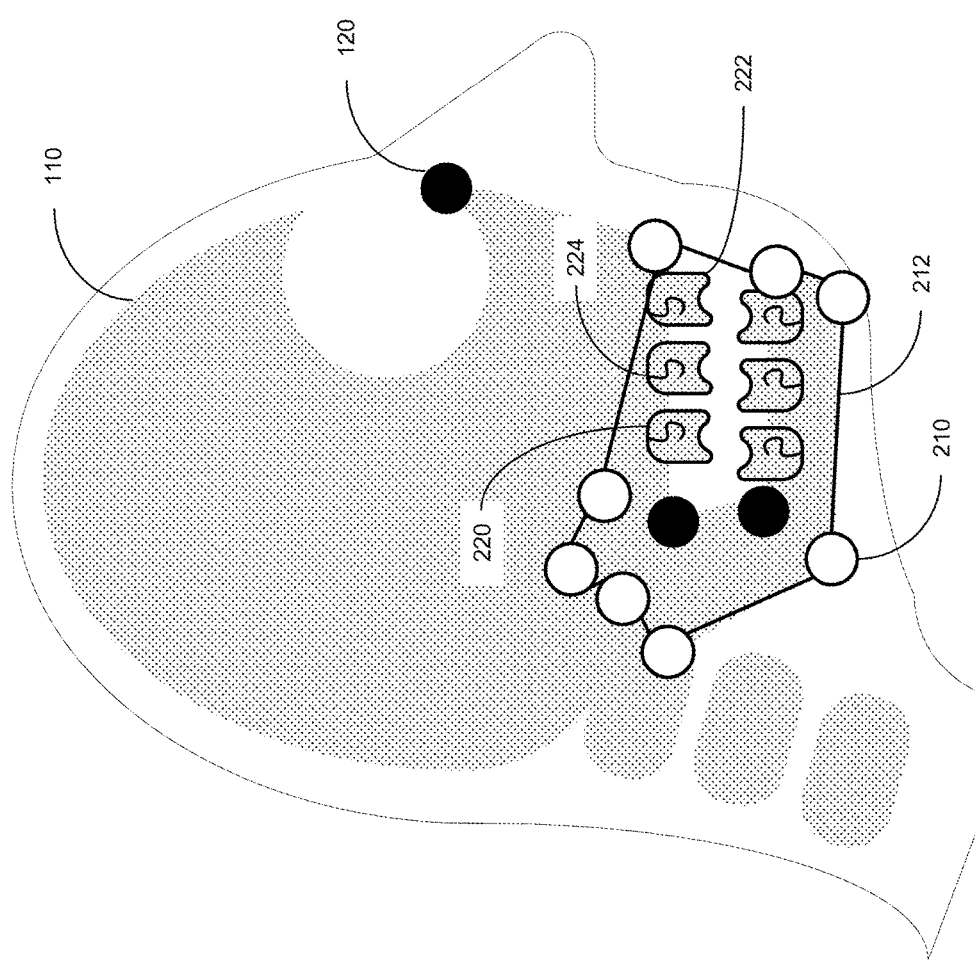
FIG. 2B illustrates an example fifth state of an example object model, in accordance with present implementations.

FIG. 2B illustrates an example fifth state of an example object model, in accordance with present implementations. As illustrated by way of example in FIG. 2B, an example object model 200B includes the object model source 110, the landmarks 120, the segmentation landmarks 210, the segmentation objects 212, and dentition objects 220. In some implementations, one or more of the dentition objects 220 include corresponding dentition topology regions 222 and intradentition objects 224.

The dentition objects 220 are or include various tooth structures associated with various teeth types. In some implementations, the dentition objects are extracted in response to a dentition imager operating on a portion of the 3D model or collection of 2D models within the segmentation region defined by the segmentation landmarks 210 and the segmentation objects 212. As one example, the dentition objects 220 can include 3D models of teeth including molars, incisors, canines, and the like having a shape corresponding to teeth of an individual patient associated with the 3D model. The dentition topology regions 222 include features of the surface of the dentition objects 220. As one example, the dentition topology regions 222 can include 3D models of tooth caps, roots, cavities, and the like detected by a dentition imager. The intradentition objects 224 include features within the dentition objects 220. As one example, the intradentition objects 224 can include roots, nerves, nerve endings, enamel layers, and the like of particular teeth. Thus, in some implementations, a metric-based image processing of a segment of the 3D model or collection of 2D images can generate a 3D model of dentition structure including teeth and their internal structures corresponding to an individual patient's particular dentition structure.

Figure 3A:
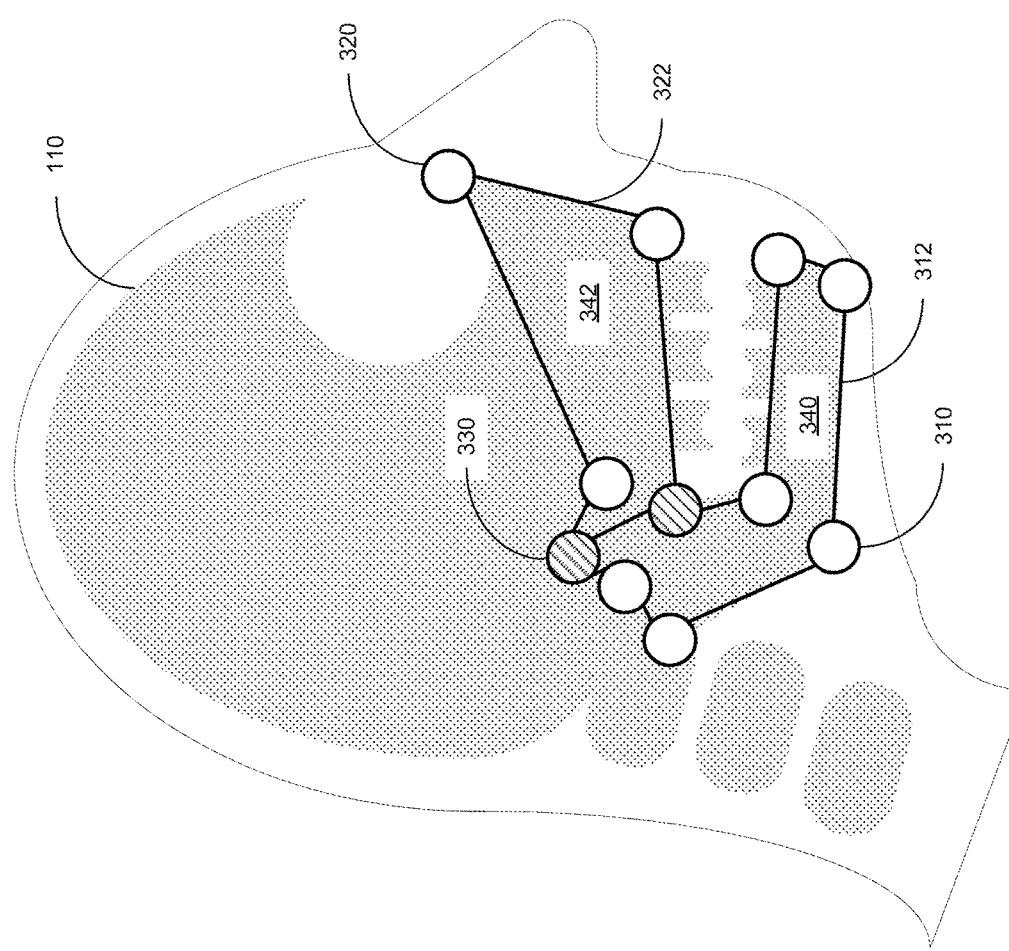
FIG. 3A illustrates an example sixth state of an example object model, in accordance with present implementations.

FIG. 3A illustrates an example sixth state of an example object model, in accordance with present implementations. As illustrated by way of example in FIG. 3A, an example object model 300A includes the object model source 110, a first segment 340 of the object model 300A, and a second segment 342 of the object model 342.

The first segment 340 and the second segment 342 are associated with respective regions of the 3D model or collection of 2D images having distinct anatomical, surgical, clinical, analytical, or like meaning. In some implementations, the first segment 340 and the second segment 342 are respectively associated with a particular subset of landmark identifiers, and the particular subsets of landmark identifiers are each associated with a respective biological structure. As one example, the first segment 340 and the second segment 342 can respectively define boundaries of multiple dentition or maxillofacial regions, and include landmarks associated with landmark identifiers defining boundaries, features, or the like, of each of the dentition or maxillofacial regions.

The first segment 340 includes landmarks 310, segmentation objects 312, and shared landmarks 330. The second segment 342 includes landmarks 320, segmentation objects 322, and the shared landmarks 330. The segmentation objects 312 and 322 are or include various landmark distance objects 122 respectively between the segmentation landmarks 310 and 320. The landmarks 310 and 320 can correspond to the landmarks 120. In some implementations, the first segment 340 and the second segment 342 can each include shared landmarks 330, where multiple maxillofacial regions meet, intersect, are proximate, or the like.

Figure 3B:
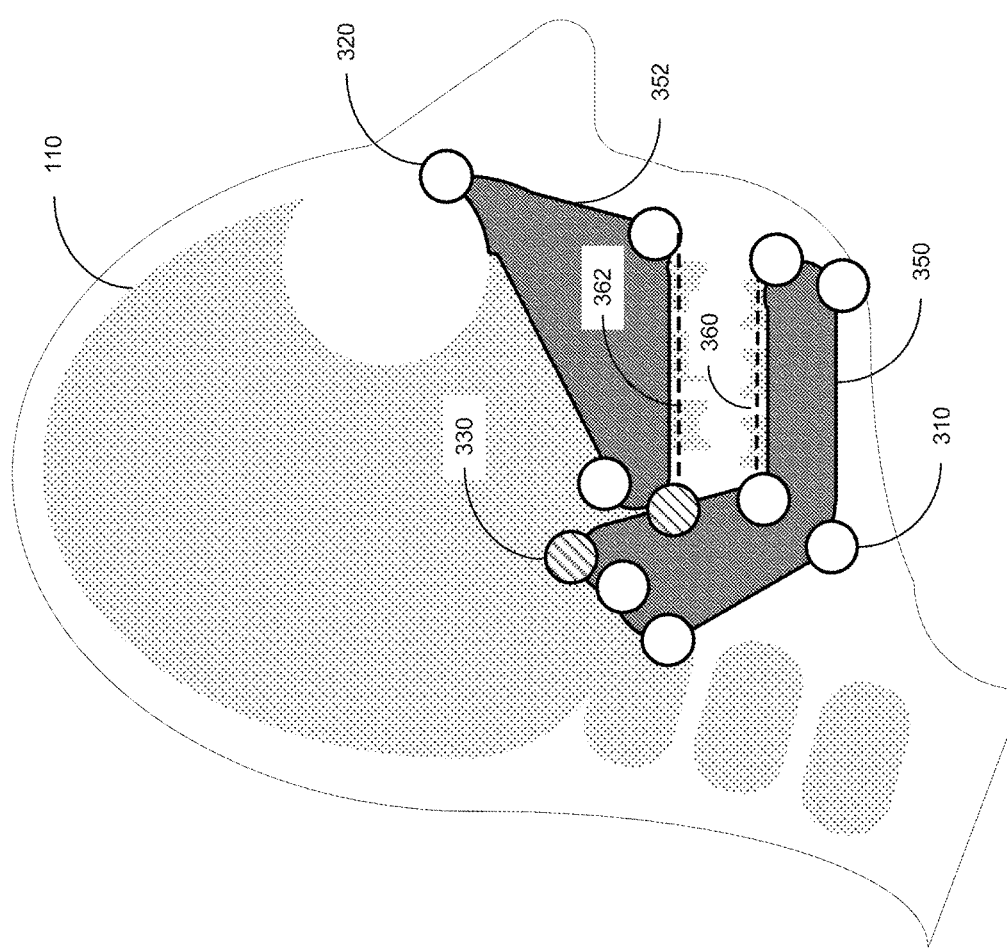
FIG. 3B illustrates an example seventh state of an example object model, in accordance with present implementations.

FIG. 3B illustrates an example seventh state of an example object model, in accordance with present implementations. As illustrated by way of example in FIG. 3B, an example object model 300B includes the object model source 110, the landmarks 310, 320 and 330, a segmented dentition object 350, a segmented maxillofacial object 352, a first arch object 360, and a second arch object 362.

The segmented dentition object 350 includes a mandible structure associated with the patient's particular mandible structure. In some implementations, the segmented dentition object 350 is extracted in response to a dentition imager operating on a portion of the 3D model or collection of 2D models within the segmentation region defined by the segmentation landmarks 310 and 330, and the segmentation objects 312. The segmented maxillofacial object 352 includes a maxillofacial structure associated with the patient's particular maxillofacial structure. In some implementations, the segmented maxillofacial object 352 is extracted in response to a dentition imager operating on a portion of the 3D model or collection of 2D models within the segmentation region defined by the segmentation landmarks 320 and 330, and the segmentation objects 322.

The first arch object 360 can include a 3D model of a lower dental arch including molars, incisors, canines, and the like having a shape corresponding to a lower dental arch of an individual patient associated with the 3D model. Similarly, the second arch object 362 can include a 3D model of an upper dental arch including molars, incisors, canines, and the like having a shape corresponding to an upper dental arch of an individual patient associated with the 3D model. Thus, in some implementations, a metric-based image processing of a segment of the 3D model or collection of 2D images can generate a 3D model of dentition including a mandible corresponding to an individual patient's particular dentition structure.

Figure 4:
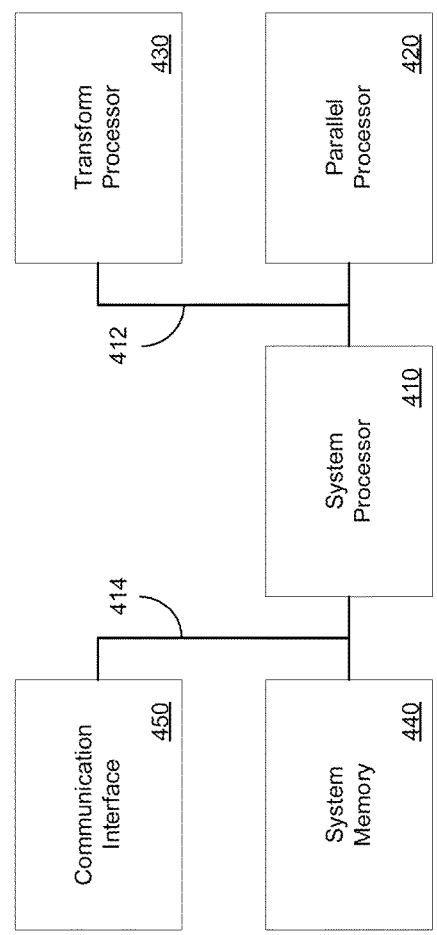
FIG. 4 illustrates an example processing system, in accordance with present implementations.

FIG. 4 illustrates an example processing system, in accordance with present implementations. As illustrated by way of example in FIG. 4, an example processing system 400 includes a system processor 410, a parallel processor 420, a transform processor 430, a system memory 440, and a communication interface 450. In some implementations, at least one of the example processing system 400 and the system processor 410 includes a processor bus 412 and a system bus 414.

The system processor 410 is operable to execute one or more instructions. In some implementations, the instructions are associated with at least one of the system memory 440 and the communication interface 450. In some implementations, the system processor 410 is an electronic processor, an integrated circuit, or the like including one or more of digital logic, analog logic, digital sensors, analog sensors, communication buses, volatile memory, nonvolatile memory, and the like. In some implementations, the system processor 410 includes but is not limited to, at least one microcontroller unit (MCU), microprocessor unit (MPU), central processing unit (CPU), graphics processing unit (GPU), physics processing unit (PPU), embedded controller (EC), or the like. In some implementations, the system processor 410 includes a memory operable to store or storing one or more instructions for operating components of the system processor 410 and operating components operably coupled to the system processor 410. In some implementations, the one or more instructions include at least one of firmware, software, hardware, operating systems, embedded operating systems, and the like.

The processor bus 412 is operable to communicate one or more instructions, signals, conditions, states, or the like between one or more of the system processor 410, the parallel processor 420, and the transform processor 430. In some implementations, the processor bus 412 includes one or more digital, analog, or like communication channels, lines, traces, or the like. It is to be understood that any electrical, electronic, or like devices, or components associated with the system bus 414 can also be associated with, integrated with, integrable with, supplemented by, complemented by, or the like, the system processor 410 or any component thereof.

The system bus 414 is operable to communicate one or more instructions, signals, conditions, states, or the like between one or more of the system processor 410, the system memory 440, and the communication interface 450. In some implementations, the system bus 414 includes one or more digital, analog, or like communication channels, lines, traces, or the like. It is to be understood that any electrical, electronic, or like devices, or components associated with the system bus 414 can also be associated with, integrated with, integrable with, supplemented by, complemented by, or the like, the system processor 410 or any component thereof.

The parallel processor 420 is operable to execute one or more instructions concurrently, simultaneously, or the like. In some implementations, the parallel processor 420 is operable to execute one or more instructions in a parallelized order in accordance with one or more parallelized instruction parameters. In some implementations, parallelized instruction parameters include one or more sets, groups, ranges, types, or the like, associated with various instructions. In some implementations, the parallel processor 420 includes one or more execution cores variously associated with various instructions. In some implementations, the parallel processor 420 includes one or more execution cores variously associated with various instruction types or the like. In some implementations, the parallel processor 420 is an electronic processor, an integrated circuit, or the like including one or more of digital logic, analog logic, communication buses, volatile memory, nonvolatile memory, and the like. In some implementations, the parallel processor 420 includes but is not limited to, at least one graphics processing unit (GPU), physics processing unit (PPU), embedded controller (EC), gate array, programmable gate array (PGA), field-programmable gate array (FPGA), application-specific integrated circuit (ASIC), or the like. It is to be understood that any electrical, electronic, or like devices, or components associated with the parallel processor 420 can also be associated with, integrated with, integrable with, supplemented by, complemented by, or the like, the system processor 410 or any component thereof.

Figure 5:
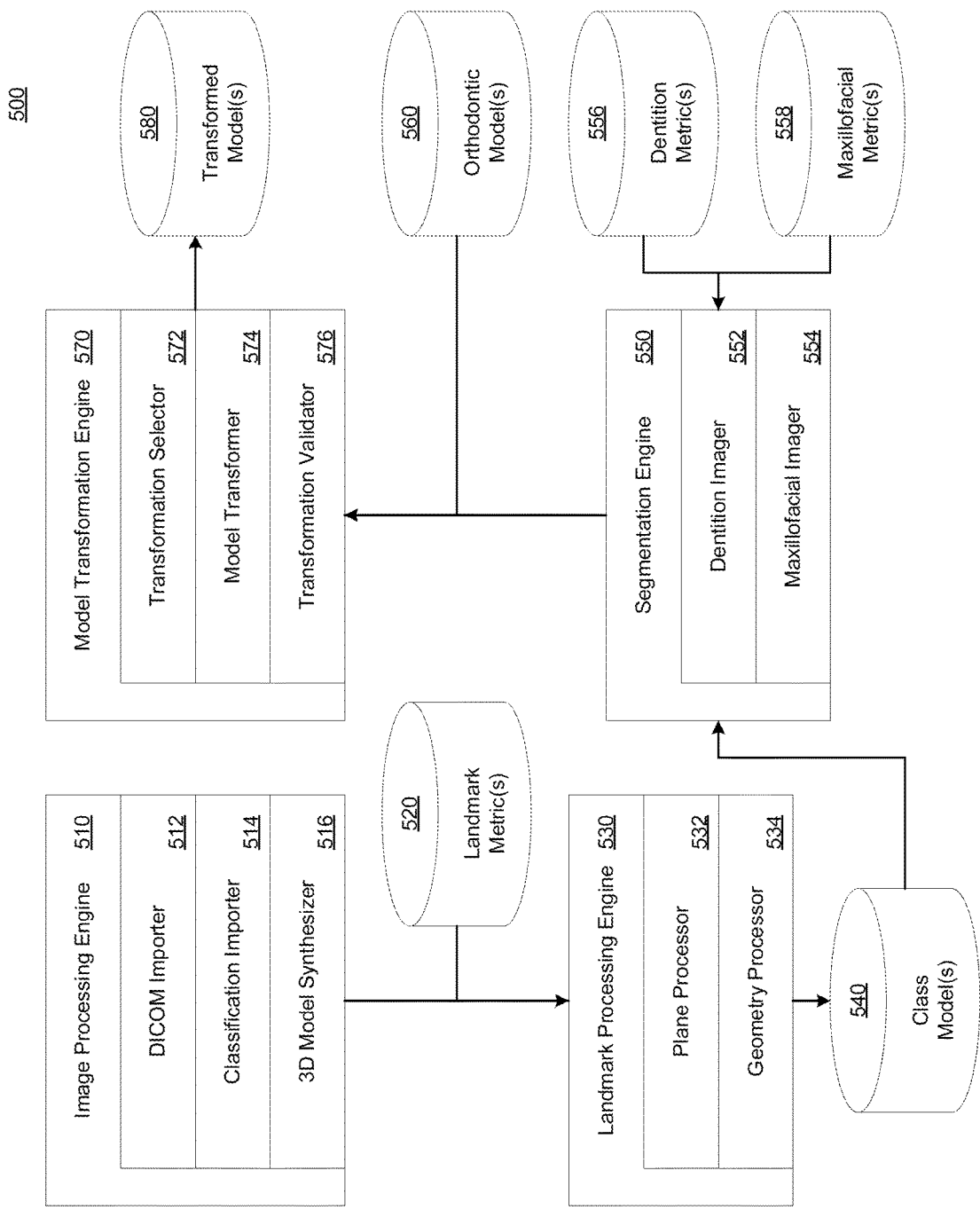
FIG. 5 illustrates an example computing system, in accordance with present implementations.

In some implementations, various cores of the parallel processor 420 are associated with one or more parallelizable operations in accordance with one or more metrics, engines, models, and the like, of the example computing system of FIG. 5. As one example, parallelizable operations include processing portions of an image, video, waveform, audio waveform, processor thread, one or more layers of a learning model, one or more metrics of a learning model, one or more models of a learning system, and the like. In some implementations, a predetermined number or predetermined set of one or more particular cores of the parallel processor 420 are associated exclusively with one or more distinct sets of corresponding metrics, engines, models, and the like, of the example computing system of FIG. 5. As one example, a first core of the parallel processor 420 can be assigned to, associated with, configured to, fabricated to, or the like, execute one engine of the example computing system of FIG. 5. In this example, a second core of the parallel processor 420 can also be assigned to, associated with, configured to, fabricated to, or the like, execute another engine of the example computing system of FIG. 5. Thus, in some implementations, the parallel processor 420 is configured to parallelize execution across one or more metrics, engines, models, and the like, of the example computing system of FIG. 5. Similarly, in some implementations, a predetermined number or predetermined set of one or more particular cores of the parallel processor 420 are associated collectively with corresponding metrics, engines, models, and the like, of the example computing system of FIG. 5. As one example, a first plurality of cores of the parallel processor can be assigned to, associated with, configured to, fabricated to, or the like, execute one engine of the example computing system of FIG. 5. In this example, a second plurality of cores of the parallel processor can also be assigned to, associated with, configured to, fabricated to, or the like, execute another engine of the example computing system of FIG. 5. Thus, in some implementations, the parallel processor 420 is configured to parallelize execution within one or more metrics, engines, models, and the like, of the example computing system of FIG. 5.

The transform processor 430 is operable to execute one or more instructions associated with one or more predetermined transformation processes. As one example, transformation processes include Fourier transforms, matrix operations, calculus operations, combinatoric operations, trigonometric operations, geometric operations, encoding operations, decoding operations, compression operations, decompression operations, image processing operations, audio processing operations, and the like. In some implementations, the transform processor 430 is operable to execute one or more transformation processes in accordance with one or more transformation instruction parameters. In some implementations, transformation instruction parameters include one or more instructions associating the transform processor 430 with one or more predetermined transformation processes. In some implementations, the transform processor 430 includes one or more transformation processes. Alternatively, in some implementations, the transform processor 430 is a plurality of transform processor 430 associated with various predetermined transformation processes. Alternatively, in some implementations, the transform processor 430 includes a plurality of transformation processing cores each associated with, configured to execute, fabricated to execute, or the like, a predetermined transformation process. In some implementations, the parallel processor 420 is an electronic processor, an integrated circuit, or the like including one or more of digital logic, analog logic, communication buses, volatile memory, non-volatile memory, and the like. In some implementations, the parallel processor 420 includes but is not limited to, at least one graphics processing unit (GPU), physics processing unit (PPU), embedded controller (EC), gate array, programmable gate array (PGA), field-programmable gate array (FPGA), application-specific integrated circuit (ASIC), or the like. It is to be understood that any electrical, electronic, or like devices, or components associated with the transform processor 430 can also be associated with, integrated with, integrable with, supplemented by, complemented by, or the like, the system processor 410 or any component thereof.

In some implementations, the transform processor 430 is associated with one or more predetermined transform processes in accordance with one or more metrics, engines, models, and the like, of the example computing system of FIG. 5. In some implementations, a predetermined transform process of the transform processor 430 is associated with one or more corresponding metrics, engines, models, and the like, of the example computing system of FIG. 5. As one example, the transform processor 430 can be assigned to, associated with, configured to, fabricated to, or the like, execute one matrix operation associated with one or more engines, metrics, models, or the like, of the example computing system of FIG. 5. As another example, the transform processor 430 can alternatively be assigned to, associated with, configured to, fabricated to, or the like, execute another matrix operation associated with one or more engines, metrics, models, or the like, of the example computing system of FIG. 5. Thus, in some implementations, the transform processor 430 is configured to centralize, optimize, coordinate, or the like, execution of a transform process across one or more metrics, engines, models, and the like, of the example computing system of FIG. 5. In some implementations, the transform processor is fabricated to, configured to, or the like, execute a particular transform process with at least one of a minimum physical logic footprint, logic complexity, heat expenditure, heat generation, power consumption, and the like, with respect to at least one metrics, engines, models, and the like, of the example computing system of FIG. 5.

The system memory 440 is operable to store data associated with the example processing system 400. In some implementations, the system memory 440 includes ones or more hardware memory devices for storing binary data, digital data, or the like. In some implementations, the system memory 440 includes one or more electrical components, electronic components, programmable electronic components, reprogrammable electronic components, integrated circuits, semiconductor devices, flip flops, arithmetic units, or the like. In some implementations, the system memory 440 includes at least one of a non-volatile memory device, a solid-state memory device, a flash memory device, and a NAND memory device. In some implementations, the system memory 440 includes one or more addressable memory regions disposed on one or more physical memory arrays. In some implementations, a physical memory array includes a NAND gate array disposed on a particular semiconductor device, integrated circuit device, printed circuit board device, and the like.

The communication interface 450 is operable to communicatively couple the system processor 410 to an external device. In some implementations, an external device includes but is not limited to a smartphone, mobile device, wearable mobile device, tablet computer, desktop computer, laptop computer, cloud server, local server, and the like. In some implementations, the communication interface 450 is operable to communicate one or more instructions, signals, conditions, states, or the like between one or more of the system processor 410 and the external device. In some implementations, the communication interface 450 includes one or more digital, analog, or like communication channels, lines, traces, or the like. As one example, the communication interface 450 is or includes at least one serial or parallel communication line among multiple communication lines of a communication interface. In some implementations, the communication interface 450 is or includes one or more wireless communication devices, systems, protocols, interfaces, or the like. In some implementations, the communication interface 450 includes one or more logical or electronic devices including but not limited to integrated circuits, logic gates, flip flops, gate arrays, programmable gate arrays, and the like. In some implementations, the communication interface 450 includes ones or more telecommunication devices including but not limited to antennas, transceivers, packetizers, wired interface ports, and the like. It is to be understood that any electrical, electronic, or like devices, or components associated with the communication interface 450 can also be associated with, integrated with, integrable with, replaced by, supplemented by, complemented by, or the like, the system processor 410 or any component thereof.

FIG. 5 illustrates an example computing system, in accordance with present implementations. In some implementations, the example computing system 500 corresponds to the system memory 440. As illustrated by way of example in FIG. 5, an example computing system 500 includes an image processing engine 510, a landmark metric database 520, a landmark processing engine 530, a class model database 540, a segmentation engine 550, a dentition metric database 556, a maxillofacial metric database 558, an orthodontic model database 560, a model transformation engine 570, and a transformed model database 580. It is to be understood that one or more of the engines and databases can be located, stored, or the like, in a single logical or physical block or areas of the system memory 440, or distributed at or across multiple physical or virtual devices, or associated with corresponding dedicated devices.

The image processing engine 510 is operable to generate at least one three-dimensional (3D) model based on one or more two-dimensional (2D) images. In some implementations, the image processing engine 510 includes at least one of a DICOM importer 512, a classification importer 514, and a three-dimensional model synthesizer 516.

The DICOM importer 512 is operable to obtain one or more images in a DICOM format or the like. In some implementations, the DICOM importer 512 is operable to obtain one or more images along one or more axes or planes corresponding to a patient facial region, dentition region, oral region, maxillofacial region, or the like. It is to be understood that the DICOM importer 512 can obtain and process images in formats other than DICOM images, including but not limited to PNG, SVG, BMP, JPG, JPEG, JPEG2000, TIFF, and the like.

The classification importer 514 is operable to obtain one or more classifications associated with one or more of the 2D images obtained by the DICOME importer 512. In some implementations, classifications include one or more tags, associations, flag, bits, strings, or the like associated with a corresponding one or more of the 2D images and indicating a characteristic of those 2D images. As one example, a classification can include an indication that a particular 2D image is associated with a particular age, demographic, gender, health condition, or the like. In some implementations, the 2D images can be associated with more than one classification, that as a group can identify a 2D image classification with increased granularity. In this example, a group of 2D images can be classified as associated with a gender classification indicating a female gender, and an age classification indicating 10 years of age. As another example, a group of 2D images can be classified as associated with an individual from whom the 2D images are derived, associated, or the like. Thus, all 2D images associated with both of these classifications can be presumed to have features corresponding to 10 year old females. Thus, in some implementations, a composite 3D model based on one more classifications can be generated. In some implementations, the classification importer 514 can import 2D images associated with one or more classifications. In some implementations, the classification importer 514 can import classifications independently of 2D images and associate classifications with various 2D images in accordance with a prompt or other user input.

The three-dimensional (3D) model synthesizer 516 is operable to generate at least one 3D model corresponding to one or more 2D images. In some implementations, the 3D model synthesizer 516 is operable to filter, select, block, or the like, one or more 2D images based on one or more classifications. As one example, the 3D model synthesizer 516 can select only 2D images associated with a particular classification or particular set of classifications. Thus, the 3D model synthesizer 516 can select, for example, only 2D images associated with a particular individual or a particular subset of classifications. As one example, a subset of classifications can be applied to select only 2D images associated with females between ages 6 and 12. As another example, a subset of classifications can be applied to select only 2D images associated with males between ages 45 and 65. In some implementations, the 3D model synthesizer 516 generates a 3D model based on the selected 2D images, resulting in a 3D model corresponding to at least one of the 2D selected 2D images. In some implementations, the 3D model includes one or more 3D features corresponding to one or more of the selected 2D images. Thus, the 3D model synthesizer 516 is operable to generate a 3D model associated with 2D images of a particular individual, and to generate a 3D model associated with 2D images corresponding to individuals sharing one or more particular classifications.

The landmark metric database 520 includes at least one landmark model associated with one or more 3D models. In some implementations, the landmark model includes one or more landmarks. In some implementations, a landmark is or includes a geometric point having one or more coordinates mappable to a 3D model generated by, associated with, or the like, the 3D model synthesizer 516. As one example, coordinates can be Cartesian, polar, spherical, cylindrical, or the like. In some implementations, a landmark also includes a landmark identifier uniquely identifying the landmark or identifying the landmark with a predetermined features. As one example, a landmark identifier can include an identifier associating the landmark with a particular location or structure of a patient facial region, dentition region, oral region, maxillofacial region, or the like. In some implementations, the landmark metric database 520 includes one or more metrics associated with identifying coordinates associated with one or more landmarks associated with a landmark model. In some implementations, one or more landmark metrics are associated with corresponding locations, coordinates, features, or the like of a 3D model. As one example, a particular landmark can be associated with a particular position on a jaw at or near a chin. As another example, another particular landmark can be associated with a particular position on a skull at or near an eye socket. Thus, in some implementations, landmark metrics associated with the landmark database 520 are or include inputs obtainable to place a particular landmark at a particular coordinate in a 3D model.

The landmark processing engine 530 is operable to place one or more landmarks at a 3D model and generate one or more class models based on the placed landmarks. In some implementations, the landmark processing engine 530 is operable to place one or more landmarks at one or more particular coordinates in a 3D model associated with that 3D model based on landmark metrics obtained from the landmark metric database 520, and by evaluating portions of the 3D model or the 2D image data associated with the 3D model by the landmark metrics. Thus, in some implementations, the landmark processing engine 530 simplifies the 3D model by reducing the 3D model to a 3D landmark model tailored to the 3D model on which it is based. Coupled with the landmark identifiers associated with each landmark in some implementations, the landmark processing engine 530 can identify key features, positions, edges, boundaries, or the like within a 3D model by the landmarks placed at particular coordinates therein. In some implementations, the landmark processing engine 530 includes at least one of a plane processor 532 and a geometry processor 534.

The plane processor 532 is operable to generate one or more planes through a 3D model or its corresponding landmark model. In some implementations, the plan processor 532 is operable to select one or more landmarks and generate a plane relative to the selected landmarks. In some implementations, the plane processor 532 is operable to generate one or more predetermined planes relative to one or more landmarks having one or more predetermined landmark identifiers. As one example, the plane processor 532 can generate a plane through a dentition plane by selecting landmarks associated with jawlines or the like.

The geometry processor 534 is operable to generate at least one class model including one or more landmarks associated with a 3D model. In some implementations, the geometry processor 534 generates one or more node graphs including landmarks associated with the 3D model. In some implementations, the geometry processor 534 generates one or more edges through the 3D model that terminate at various landmarks. In some implementations, the geometry processor 534 generates edges terminating at various predetermined pairs of landmarks. As one example, the geometry processor 534 can generate an edge associated with a jawline between two landmarks respectively including landmark identifiers for various points on a mandible.

The class model database 540 includes at least one class model associated with one or more 3D models. In some implementations, the class model includes one or more landmarks associated with one or more classification and generated by the landmark processing engine 530. In some implementations, the class model database 540 includes class models associated with individual classifications, composite classifications, or the like. Thus, in some implementations, the class model database 540 includes landmark models associated with particular individuals and with composite classifications of individuals based on or more classifications.

The segmentation engine 550 is operable to generate, isolate, divide, or the like a 3D model into one or more subparts, portions, or the like based on a landmark model. Thus, in some implementations, the segmentations engine 550 segments a 3D model based on edges and landmarks in the associated landmark model. In some implementations, the segmentation engine 550 can divide a 2D image associated with a portion of the 3D model. In some implementations, the segmentation engine 550 includes at least one of a dentition imager 552 and a maxillofacial imager 554.

The dentition imager 552 is operable to generate one or more dentition objects within a segmented portion of the 3D model associated with dentition features. In some implementations, the dentition objects are or include one or more teeth of a patient, including geometrical structure of individual teeth of the patient. In some implementations, the dentition imager 552 includes at least one dentition feature extraction model operable based on one or more dentition metrics defining detection and modeling of teeth and dentition structures. Thus, in some implementations, the dentition imager 552 generates dentition objects corresponding to the shape, orientation, and location of individual teeth of the patient associated with the 3D model.

The maxillofacial imager 554 is operable to generate one or more maxillofacial objects within a segmented portion of the 3D model associated with dentition features. In some implementations, the maxillofacial objects are or include one or more bone structures, regions, or the like of a patient, including geometrical structure of a skull or portion thereof associated with the patient. In some implementations, the maxillofacial imager 554 includes at least one maxillofacial feature extraction model operable based on one or more maxillofacial metrics defining detection and modeling of maxillofacial structures. Thus, in some implementations, the maxillofacial imager 554 generates maxillofacial objects corresponding to the shape, orientation, and location of individual maxillofacial structures of the patient associated with the 3D model.

The dentition metric database 556 includes at least one dentition extraction model associated with one or more types of dentition structures. In some implementations, dentition structures include one or more types of teeth, tooth structures, and the like As one example, types of teeth can include incisors, molars, canines, and the like. As another example, dentition structures can include roots, crowns, and the like. In some implementations, the dentition metric database 556 includes one or more dentition metrics associated with identifying shape, orientation, and location of individual teeth of the patient associated with the 3D model.

The maxillofacial metric database 558 includes at least one maxillofacial extraction model associated with one or more types of maxillofacial structures. In some implementations, maxillofacial structures include one or more structures, regions, or the like associated with a maxillofacial area of a skull, and the like As one example, a maxillofacial structure can include a maxilla or other bone structure. In some implementations, the maxillofacial metric database 558 includes one or more maxillofacial metrics associated with identifying shape, orientation, and location of maxillofacial structures of the patient associated with the 3D model.

The orthodontic model database 560 includes at least one orthodontic model associated with one or more 3D models. In some implementations, the orthodontic model includes one or more landmarks associated with one or more orthodontic classifications. In some implementations, the orthodontic model database 560 includes orthodontic models associated with orientations of corrected orthodontic structures including dentition structures and maxillofacial structures. As another example, an orthodontic model can include a landmark model including dentition objects and maxillofacial objects in a configuration not having an overbite. Thus, in some implementations, the orthodontic model database 560 includes landmark models associated with particular orthodontic states of maxillofacial and dentition structures indicating optimal, correct, healthy, preferred, or like arrangement of those structures.

The model transformation engine 570 is operable to transform a 3D model associated with an individual in accordance with an orthodontic model. As one example, the model transformation engine 570 can compare a difference in location, shape, or the like, between a 3D model for a patient having an overbite and an orthodontic model not having an overbite condition. In some implementations, the model transformation engine 570 includes at least one of a transformation selector 572, a model transformer 574, and a transformation validator 576.

The transformation selector 572 is operable to select a transformation corresponding to an orthodontic model for a 3D model associated with an individual. In some implementations, the transformation selector 572 includes one or more comparison models operable to identify a magnitude, direction, angle, or the like, of difference between a location, orientation, or the like of one or more dentition structures, one or more maxillofacial structures, and the like. As one example, the transformation selector 572 can select an overbite transformation model, where the overbite transformation includes or is associated with a 3D model associated with the patient 3D model by one or more classifications, and includes one or more dentition structures or maxillofacial structures free of an overbite condition.

The model transformer 574 is operable to compare, modify, or the like, a 3D model associated with a patient in accordance with a selected transformation model. In some implementations, the model transformer 574 is operable to modify corresponding coordinates of one or more landmarks of a 3D model of a patient and a 3D model of a transformation model. As one example, the model transformer 574 can modify coordinates of a landmark in a patient 3D model associated with a specific feature on a jaw to match or correspond to coordinates of a landmark associated with the corresponding feature on a jaw of the transformation model. As another example, the model transformer 574 can modify position or orientation of a dentition structure or a maxillofacial structure in a patient 3D model associated with a specific tooth in a jaw to match or correspond to position or orientation of a corresponding tooth on a jaw of the transformation model. Thus, in some implementations, the model transformer 574 can generate a modification of the dentition structure or the maxillofacial structure of a 3D model for a patient.

The transformation validator 576 is operable to evaluate one or more transformations associated with the transformed 3D model. As one example, the transformation validator 576 can determine whether a transformation of a tooth results in an intersection between the tooth and a portion of a mandible adjacent to the tooth. In some implementations, the transformation validator 576 can generate an interference model indicating one or more intersections between various dentition structures and maxillofacial structures of the 3D model. In some implementations, the transformation validator 576 can generate an interference model indicating one or more proximities, or the like, between various dentition structures and maxillofacial structures of the 3D model satisfying a predetermined proximity threshold. As one example, a predetermined proximity threshold can be or include a minimum distance between a tooth and a rear of a mandible adjacent to molars and the like.

The transformed model database 580 includes at least one transformed model associated with one or more 3D models. In some implementations, the transformed model includes one or more landmarks associated with a 3D model of a patient and modified according to at least one of the model transformation engine 570 and the model transformer 574. In some implementations, the transformed model database 580 includes transformed models associated with orientations of corrected orthodontic structures including dentition structures and maxillofacial structures for particular patients. Thus, in some implementations, the transformed model database 580 includes landmark models associated with particular orthodontic states of maxillofacial and dentition structures indicating optimal, correct, healthy, preferred, or like arrangement of those structures for a particular patient's dental structure, maxillofacial structure, or both.

Figure 6:
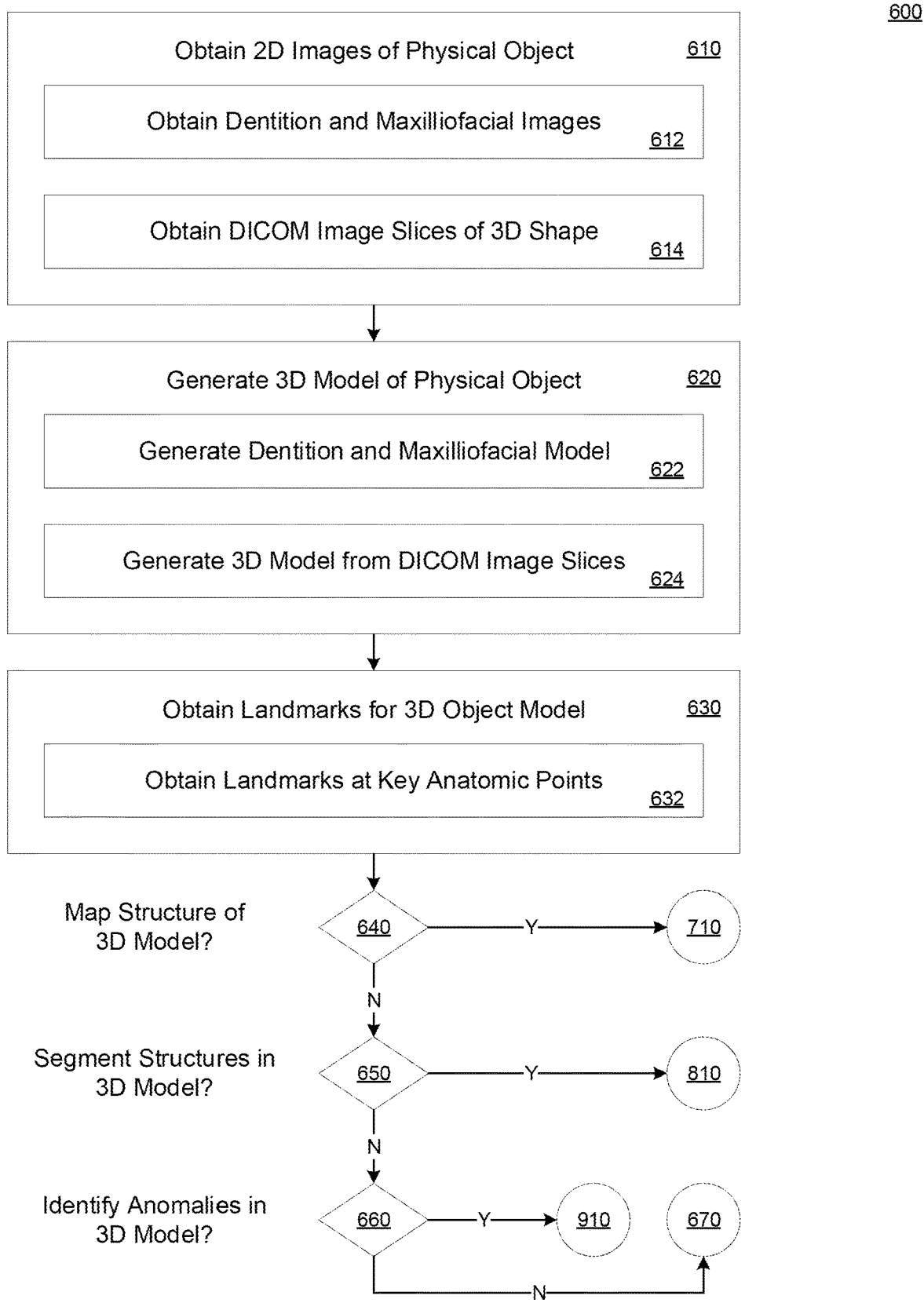
FIG. 6 illustrates an example method of generating an object model, in accordance with present implementations.

FIG. 6 illustrates an example method of generating an object model, in accordance with present implementations. In some implementations, at least one of the example processing system 400 and the example computing system 500 performs method 600 according to present implementations. In some implementations, the method 600 begins at step 610.

At step 610, the example system obtains one or more two-dimensional images of a physical object. In some implementations, step 610 includes at least one of steps 612 and 614. At step 612, the example system obtains at least one of a dentition image and a maxillofacial image. At step 614, the example system obtains at least one two-dimensional image in a DICOM image format as a slice of a three-dimensional shape. The method 600 then continues to step 620.

At step 620, the example system generates a three-dimensional model of the physical object. In some implementations, step 620 includes at least one of steps 622 and 624. At step 622, the example system generates at least one of a dentition model and a maxillofacial model. At step 624, the example system generates a three-dimensional model based on at least one two-dimensional image in a DICOM image format. The method 600 then continues to step 630.

At step 630, the example system obtains one or more landmarks associated with a three-dimensional object model. In some implementations, step 630 includes step 632. At step 632, the example system obtains mode or more landmarks associated with key anatomic points of the three-dimensional object model. In some implementations, key anatomic points include The method 600 then continues to step 640.

At step 640, the example system determines whether to map a structure of the object model. In some implementations, the example system is operable to select from a number of mapping operations, and to execute multiple mapping operations, selectively, sequentially, or the like. In accordance with a determination to map a structure of the object model, the method 600 continues to step 710. Alternatively, in accordance with a determination to forgo mapping a structure of the object model, the method 600 continues to step 650.

At step 650, the example system determines whether to segment one or more structures of the object model. In accordance with a determination to segment one or more structures of the object model, the method 600 continues to step 810. Alternatively, in accordance with a determination to forgo segmenting one or more structures of the object model, the method 600 continues to step 660.

At step 660, the example system determines whether to identify one or more anomalies in the object model. In accordance with a determination to identify one or more anomalies in the object model, the method 600 continues to step 910. Alternatively, in accordance with a determination to forgo identifying one or more anomalies in the object model, the method 600 continues to step 670. At step 670, the example system forgoes further action. In some implementations, the method 600 ends at step 670.

Figure 7:
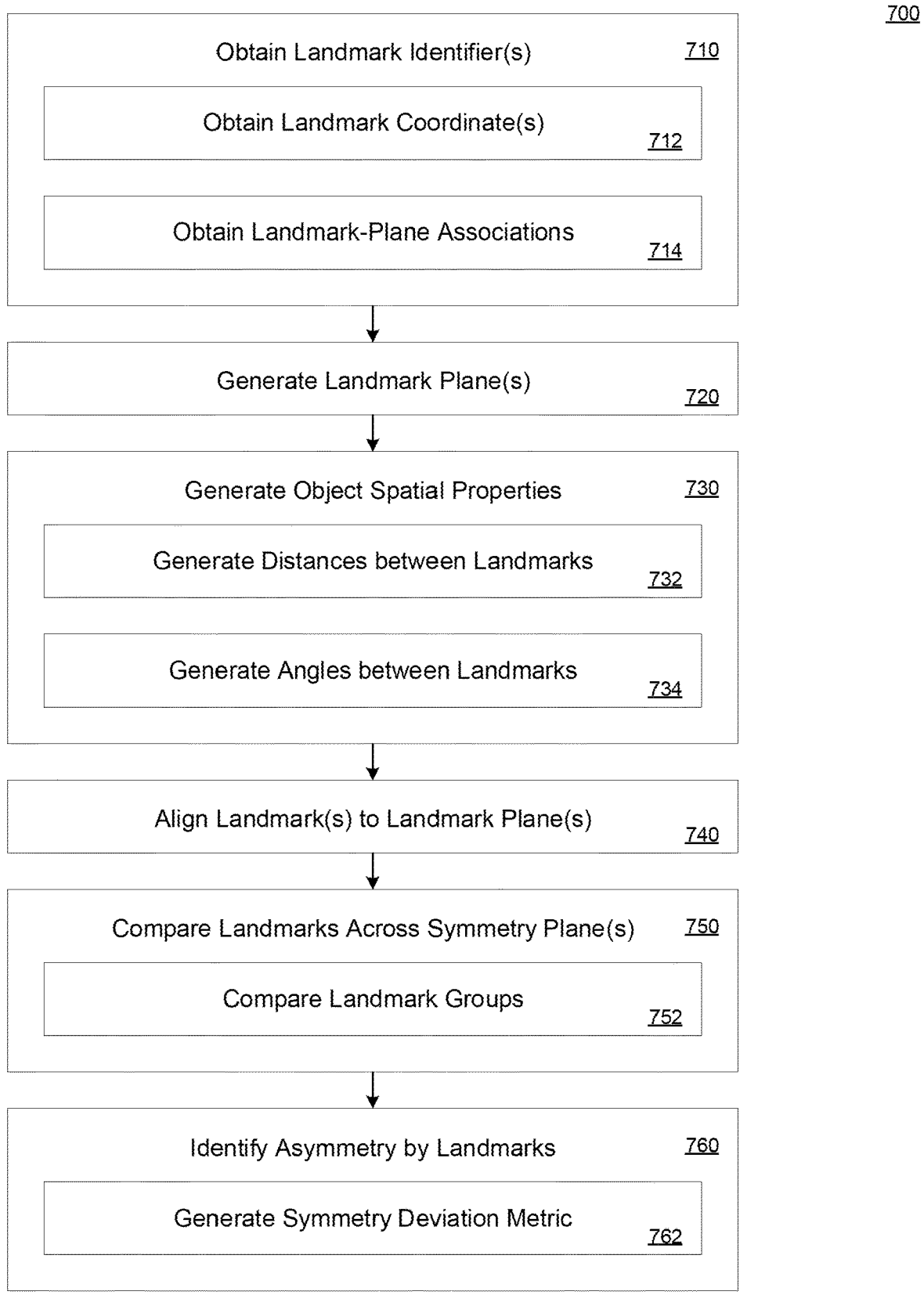
FIG. 7 illustrates an example method of mapping an object model, in accordance with present implementations.

FIG. 7 illustrates an example method of mapping an object model, in accordance with present implementations. In some implementations, at least one of the example processing system 400 and the example computing system 500 performs method 700 according to present implementations. In some implementations, the method 700 begins at step 710.

At step 710, the example system obtains at least one landmark identifier. In some implementations, step 710 includes at least one of steps 712 and 714. At step 712, the example system obtains at least one landmark coordinate associated with a landmark. At step 714, the example system obtains at least one association between a landmark and a predetermined plane associated with an object model or object model class. The method 700 then continues to step 720. At step 720, the example system generates at least one landmark plane. The method 700 then continues to step 730.

At step 730, the example system generates one or more spatial properties associated with the object model. In some implementations, step 730 includes at least one of steps 732 and 734. At step 732, the example system generates a distance metric between landmarks. At step 734, the example system generates an angle metric between landmarks. The method 700 then continues to step 740.

At step 740, the example system aligns at least one landmark to a landmark plane. In some implementations, the example system aligns the landmark in accordance with one or more relative locations of one or more predetermined landmarks. The method 700 then continues to step 750.

At step 750, the example system compares landmarks across a symmetry plane. In some implementations, step 750 includes step 752. At step 752, the example system compares a group of landmarks across the symmetry plane. The method 700 then continues to step 760.

At step 760, the example system identifies asymmetries based at least partially on one or more landmarks. In some implementations, step 760 includes step 762. At step 762, the example system generates at least one symmetry deviation metric. In some implementations, the deviation metric is or includes a difference between a distance, angle or the like of a first group of landmarks associated with a 3D model of a patient, and a corresponding distance, angle or the like of a second group of landmarks associated with a transformed 3D model of the patient. Thus, in some implementations, the example system determines a degree of change to one or more dentition structures, maxillofacial structures, or the like for an individual patient. In some implementations, the method 700 ends at step 760.

Figure 8A:
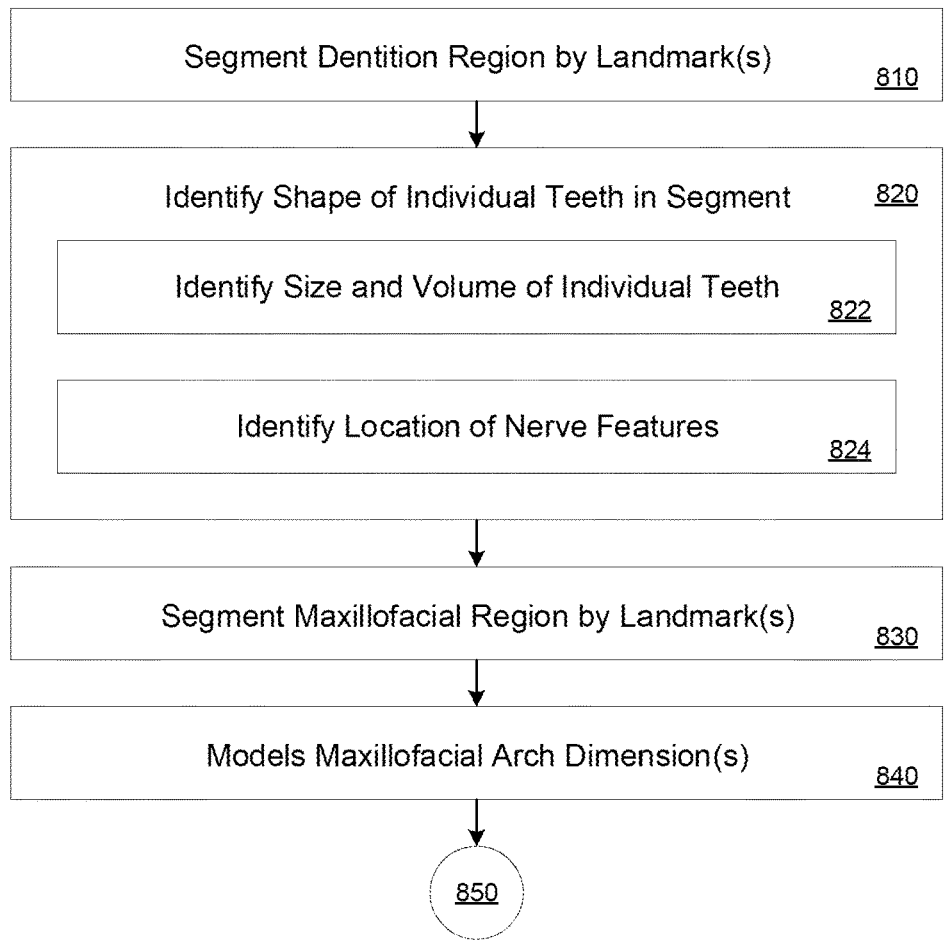
FIG. 8A illustrates an example method of segmenting an object model, in accordance with present implementations.

FIG. 8A illustrates an example method of segmenting an object model, in accordance with present implementations. In some implementations, at least one of the example processing system 400 and the example computing system 500 performs method 800A according to present implementations. In some implementations, the method 800A begins at step 810.

At step 810, the example system segments a dentition region by one or more landmarks. In some implementations, the example system segments the dentition region by generating a segmented portion of an image within one or more landmarks based on identifiers associated with those landmarks. The method 800A then continues to step 820.

At step 820, the example system identifies a shape of one or more individual teeth in a segmented region. In some implementations, the example system identifies a shape of one or more individual teeth based on one more dentition metrics indicating likelihood that a particular feature in a model or image is associated with a feature of a tooth surface. In some implementations, the example system executes one or more machine learning processes based on the dentition metrics as input to generate wireframe shapes or the like for each individual tooth. In some implementations, the example system executes one or more machine learning processes based on the dentition metrics corresponding to particular types of tooth or dentition structure. In some implementations, step 820 includes at least one of steps 822 and 824. At step 822, the example system identifies one or more of size and volume of one or more individual teeth. In some implementations, the example system identifies size and volume of the tooth or dentition structure based on a wireframe shape or the like associated with that tooth or dentition structure. At step 824, the example system identifies location of one or more nerve features associated with one or more corresponding teeth. In some implementations, the example system identifies a shape of one or more individual teeth based on one more dentition metrics indicating likelihood that a particular feature in a model or image is associated with a feature within a tooth volume. As one example, such a feature can include a nerve or cavity structure within a tooth, or volume normally enclosed by a tooth, in the case of cavities. The method 800A then continues to step 830.

At step 830, the example system segments a maxillofacial region by one or more landmarks. In some implementations, the example system identifies a shape of one or more maxillofacial bones, structures, or the like, based on one more maxillofacial metrics indicating likelihood that a particular feature in a model or image is associated with a feature of a maxillofacial surface. In some implementations, the example system executes one or more machine learning processes based on the maxillofacial metrics as input to generate wireframe shapes or the like for each individual maxillofacial structure. In some implementations, the example system executes one or more machine learning processes based on the maxillofacial metrics corresponding to particular types of maxillofacial structures. As one example, maxillofacial structures can include but are not limited to bone structures of the skull and mandible. The method 800A then continues to step 840.

At step 840, the example system models one or more maxillofacial arch dimensions. In some implementations, the example system generates one or more dimensional classifications, labels, or the like, associated with one or more maxillofacial or dentition structures. As one example, the example system can generate a classification of a curve, parabolic curve, length, width, and the like, for a lower arch and an upper arch. The method 800A then continues to step 850. It is to be understood that the example system can select machine learning metrics particular to a corresponding maxillofacial structure or dentition structure in accordance with a determination to extract a structure from a segment in which the structure is expected to be located, thus reducing the search space and increasing speed and efficiency of processing.

Figure 8B:
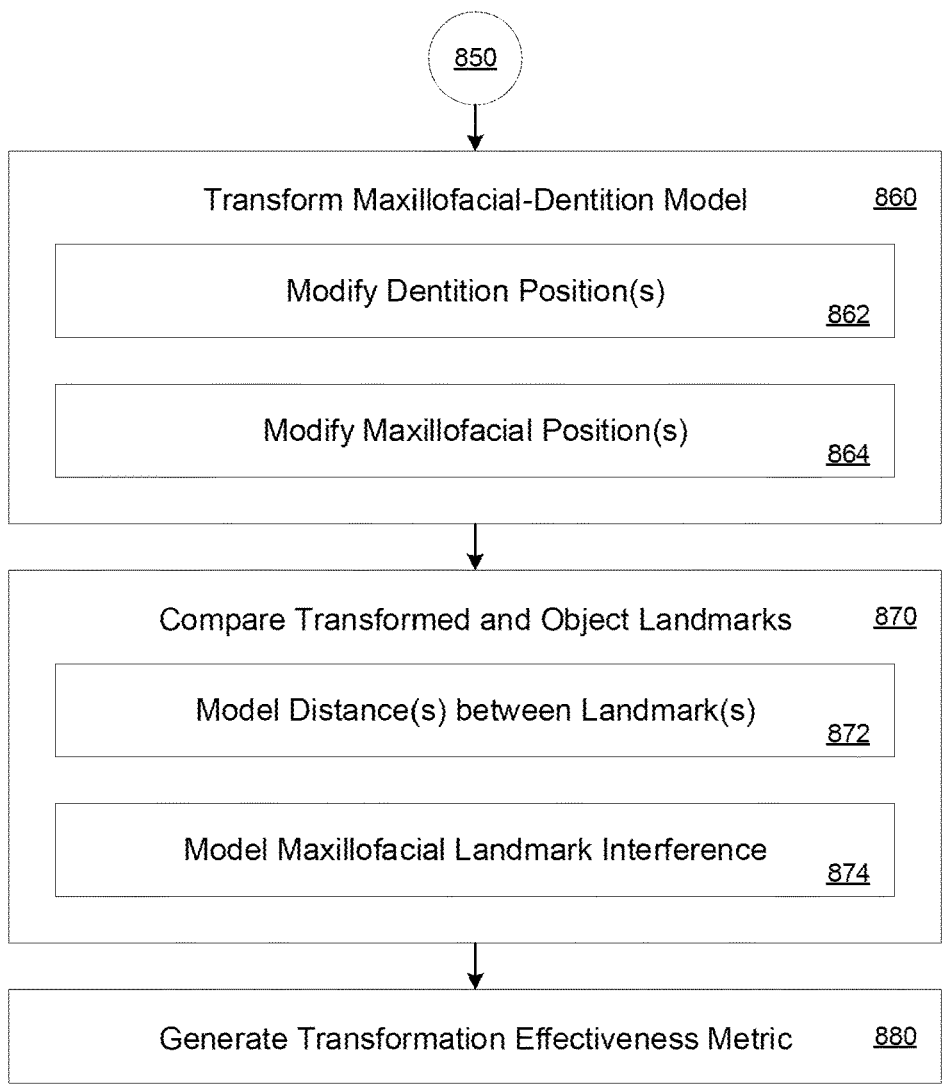
FIG. 8B illustrates an example method of segmenting an object model further to the example method of FIG. 8A.

FIG. 8B illustrates an example method of segmenting an object model further to the example method of FIG. 8A. In some implementations, at least one of the example processing system 400 and the example computing system 500 performs method 800B according to present implementations. In some implementations, the method 800B begins at step 850. The method 800B then continues to step 860.

At step 860, the example system transforms a maxillofacial-dentition model. In some implementations, step 860 includes at least one of steps 862 and 864. At step 862, the example system modifies at least one dentition position. At step 864, the example system modifies at least one maxillofacial position. The method 800B then continues to step 870.

At step 870, the example system compares at least one transformed landmark with at least one object landmark. In some implementations, step 870 includes at least one of steps 872 and 874. At step 872, the example system models at least one distance between corresponding object and transformed landmarks. At step 874, the example system models interference of a transformed maxillofacial structure. The method 800B then continues to step 880.

At step 880, the example system generates a transformation effectiveness metric. In some implementations, the method 800B ends at step 880.

Figure 9:
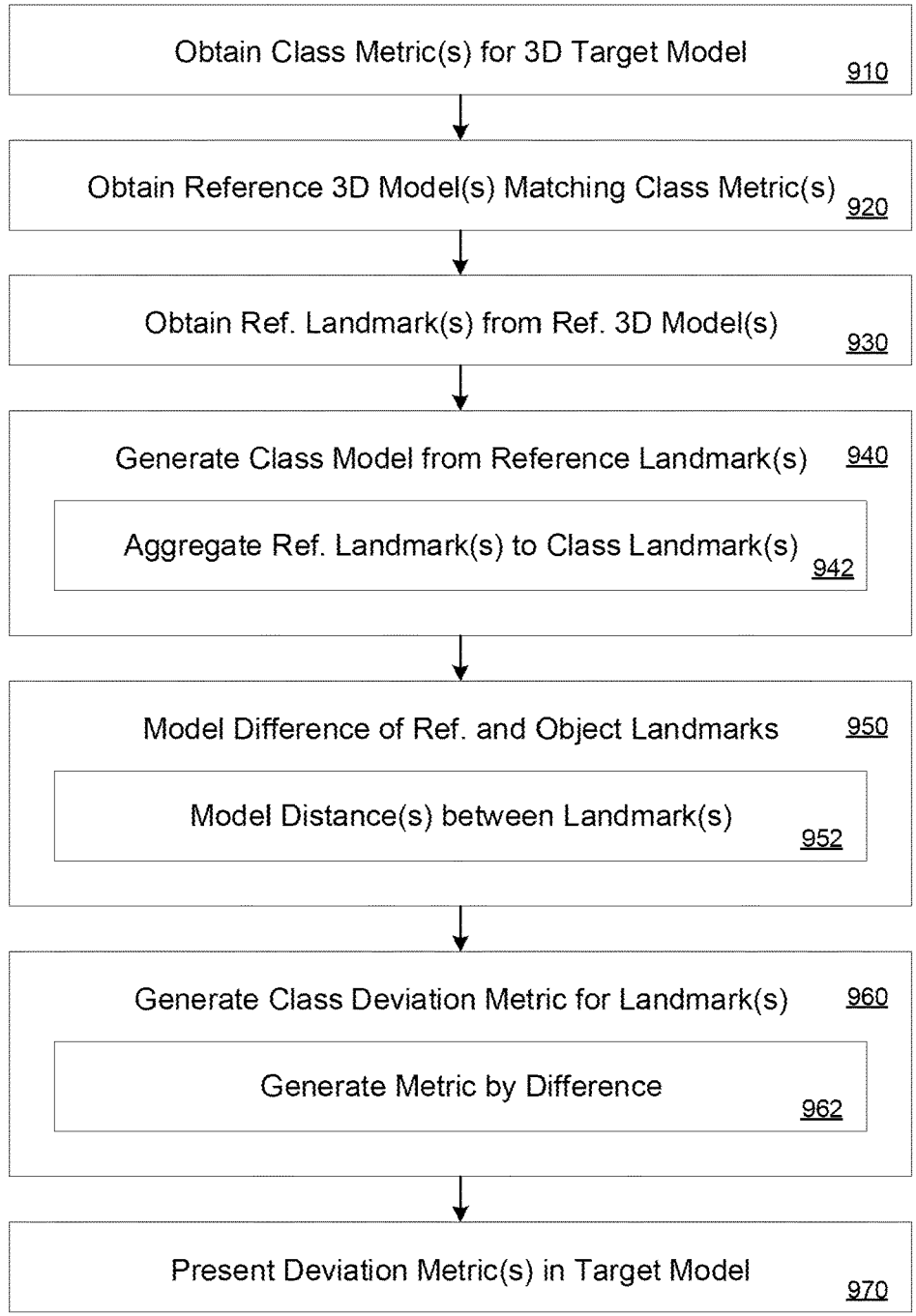
FIG. 9 illustrates an example method of comparing an object model with other object models sharing a characteristic with the object model, in accordance with present implementations.

FIG. 9 illustrates an example method of comparing an object model with other object models sharing a characteristic with the object model, in accordance with present implementations. In some implementations, at least one of the example processing system 400 and the example computing system 500 performs method 900 according to present implementations. In some implementations, the method 900 begins at step 910.

At step 910, the example system obtains at least one class metric associated with a three-dimensional target object model. As one example, a class metric includes a classification including but not limited to age, gender, demographics, and the like. The method 900 then continues to step 920.

At step 920, the example system obtains at least one three-dimensional reference model associated with the class metric. In some implementations, the reference model is obtained from an external or integrated system. In some implementations, the reference model includes multiple landmarks including landmark identifiers located at features within a 3D model corresponding to the landmark identifiers. The method 900 then continues to step 930. At step 930, the example system obtains one or more reference landmarks associated with the reference model. The method 900 then continues to step 940.

At step 940, the example system generates a class model based on one or more of the reference landmarks. In some implementations, step 940 includes step 942. At step 942, the example system aggregates a plurality of corresponding reference landmarks into at least one class landmark. The method 900 then continues to step 950.

At step 950, the example system models at least one difference between corresponding class landmarks and target landmarks associated with the target model. In some implementations, step 950 includes step 952. At step 952, the example system models a distance between a class landmark and a corresponding target landmark. The method 900 then continues to step 960.

At step 960, the example system generates a class deviation metric associated with one or more target landmarks. In some implementations, step 960 includes step 962. At step 962, the example system generates the class deviation metric based at least partially on the difference between corresponding class landmarks and target landmarks. The method 900 then continues to step 970. At step 970, the example system presents one or more deviation metrics in association with the target model. In some implementations, the method 900 ends at step 970.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of mapping and segmenting a physical object, comprising:
   obtaining a plurality of two-dimensional images of a physical object;
   generating a three-dimensional object model of the physical object based at least partially on one or more of the two-dimensional images;
   obtaining a plurality of landmarks associated with the object model, one or more of the landmarks being respectively associated with corresponding three-dimensional coordinates and object plane identifiers;
   generating at least one landmark plane at the object model including one or more of the landmarks including the object plane identifiers;
   generating a symmetry plane dividing the object model into a first object model region and a second object model region;
   selecting a first landmark from the plurality of landmarks located within the first object model region, and a second landmark from the plurality of landmarks located within the second object model region;
   extracting first coordinates from the first landmark and second coordinates from the second landmark; and
   generating a symmetry metric based on the first coordinates and the second coordinates.

2. The method of claim 1, further comprising:
   modifying at least a portion of at least one of the three-dimensional coordinates to intersect with the at least one landmark plane.

3. The method of claim 1, further comprising:
   in accordance with a determination that the symmetry metric satisfies an asymmetry threshold, modifying at least one of the first landmark and the second landmark.

4. The method of claim 1, wherein the first landmark comprises a plurality of first landmarks associated with a first structure of the object model, and the second landmark comprises a plurality of second landmarks associated with a second structure of the object model.

5. The method of claim 1, wherein the physical object comprises a maxillofacial structure and the object model comprises a three-dimensional model of the maxillofacial structure.

6. The method of claim 1, wherein the physical object comprises a dentition structure and the object model comprises a three-dimensional model of the dentition structure.

7. A method of mapping and segmenting a physical object, comprising:
   obtaining a plurality of two-dimensional images of a physical object;
   generating a three-dimensional object model of the physical object based at least partially on one or more of the two-dimensional images;
   obtaining a plurality of landmarks associated with the object model, one or more of the landmarks being respectively associated with corresponding three-dimensional coordinates and object plane identifiers;
   generating at least one landmark plane at the object model including one or more of the landmarks including the object plane identifiers;
   selecting a first landmark set and a second landmark set from the plurality of landmarks; and
   segmenting the object model into a first segmented region based on the first landmark set and a second segmented region based on the second landmark set.

8. The method of claim 7, further comprising:
   identifying a maxillofacial arch object substantially in the first segmented region; and
   generating a maxillofacial arch metric associated with the maxillofacial arch object,
   wherein the first segmented region is associated with a maxillofacial region of the object model.

9. The method of claim 8, further comprising:
   identifying a dental object substantially in the second segmented region; and
   generating a dental object metric associated with the dental object,
   wherein the second segmented region is associated with a dentition region of the object model.

10. The method of claim 9, further comprising:
    modifying at least one of the dental object and the maxillofacial arch object.

11. A system of mapping and segmenting a physical object, comprising:
    an image processing engine operable by a processor to obtain a plurality of two-dimensional images of a physical object, and generate a three-dimensional object model of the physical object based at least partially on one or more of the two-dimensional images;
    a landmark processing engine operable by the processor to obtain a plurality of landmarks associated with the object model, one or more of the landmarks being respectively associated with corresponding three-dimensional coordinates and object plane identifiers, and to generate at least one landmark plane at the object model including one or more of the landmarks including the object plane identifiers; and
    an object model segmenter operable by the processor to select a first landmark set and a second landmark set from the plurality of landmarks, and segment the object model into a first segmented region based on the first landmark set and a second segmented region based on the second landmark set.

12. The system of claim 11, wherein the landmark processing engine is further operable by the processor to generate a symmetry plane dividing the object model into a first object model region and a second object model region, select a first landmark from the plurality of landmarks located within the first object model region, and a second landmark from the plurality of landmarks located within the second object model region, extract first coordinates from the first landmark and second coordinates from the second landmark, and generate a symmetry metric based on the first coordinates and the second coordinates.

13. The system of claim 11, wherein the object model segmenter is further operable by the processor to identify a maxillofacial arch object substantially in the first segmented region, and generate a maxillofacial arch metric associated with the maxillofacial arch object, and
    wherein the first segmented region is associated with a maxillofacial region of the object model.

14. The system of claim 13, wherein the object model segmenter is further operable by the processor to identify a dental object substantially in the second segmented region, and generate a dental object metric associated with the dental object, and
    wherein the second segmented region is associated with a dentition region of the object model.

15. The system of claim 11, further comprising:
a model transformation engine operable by the processor to modify at least one of the dental object, generate a transformed object based on the modified dental object, and validate the transformed object in accordance with at least one orthodontic model.

\* \* \* \* \*